UNITED STATES PATENT OFFICE.

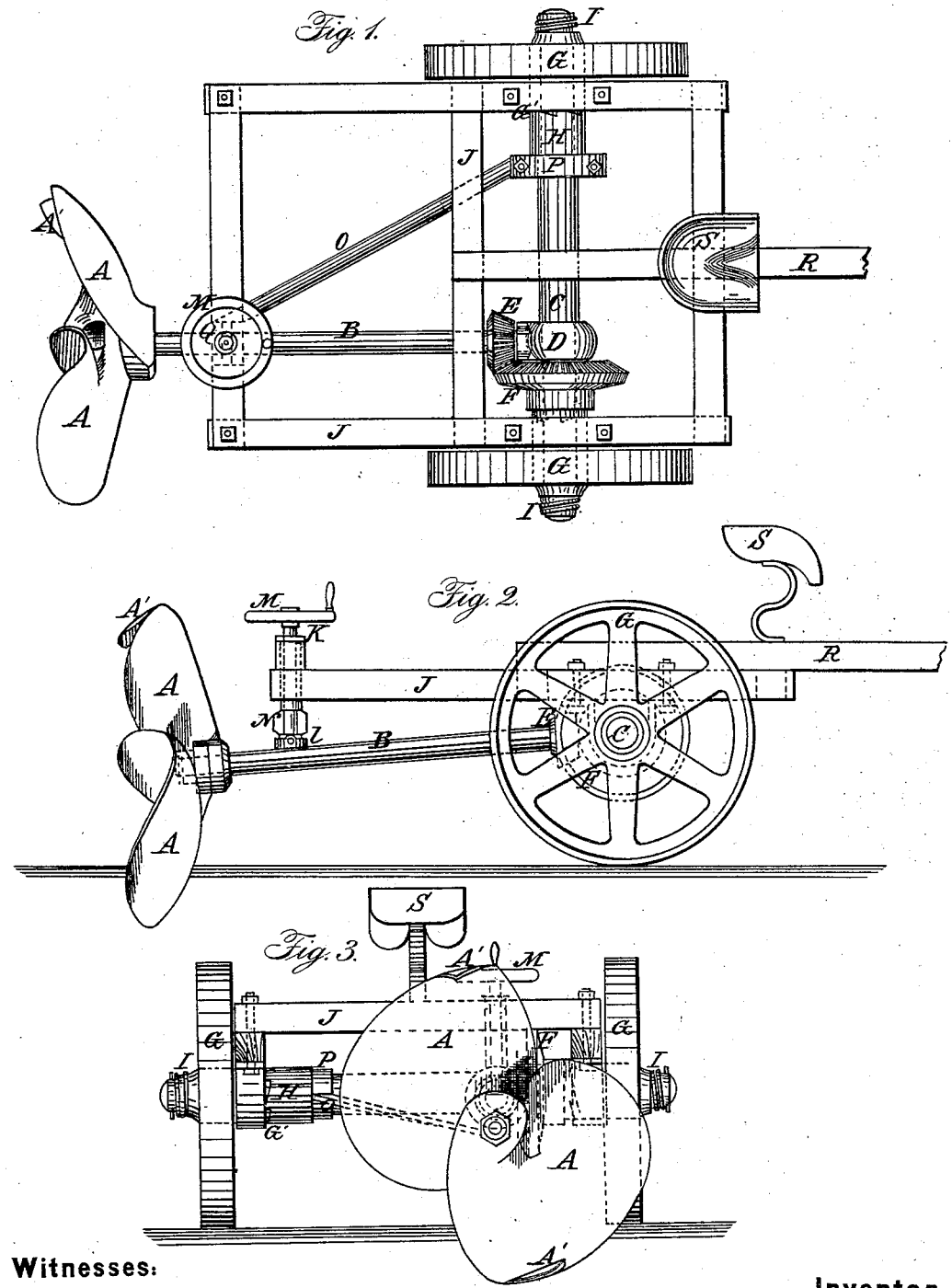

LEVI H. COLBORN, OF CHICAGO, ILLINOIS.

IMPROVEMENT IN ROTARY-PLOWS.

Specification forming part of Letters Patent No. 53,577, dated April 3, 1866.

*To all whom it may concern:*

Be it known that I, LEVI H. COLBORN, of the city of Chicago, county of Cook, and State of Illinois, have invented a new and Improved Rotary Plow; and I do hereby declare that the following is a full and exact description thereof, reference being had to the accompanying drawings, making a part of this specification, in which—

Figure I is a plan of my invention. Fig. II is a side elevation. Fig. III is an end elevation.

The nature of my invention relates, first, to constructing the plow-blade or plowshare of a rotary plow upon the general principle of a propelling-screw; second, giving the plow-blades, in addition to their helical or screw form, such gradually increasing curvature from the periphery toward the axis, and from the entering toward the leaving edge, as will cause them, as they cut into and pass through the soil, to lift the same and turn it over, as is done by the mold-board of the common plow; third, making that part of the blade which first enters the soil sharp, to act as a colter; fourth, attaching to the periphery of the blade or plow-share a cutter or cutters, projecting at right angles, in order to give a horizontal slicing or under cut to the furrow, so that the furrow will easily follow the curve of the blade and be turned over; fifth, making the blades or plowshares adjustable on the shaft, so that they may be set to cut furrows of different widths; sixth, connecting the plow-shaft to the axle of the driving-wheels by a loose journal, so that the plow may vibrate in order to pass obstructions; seventh, the combination of out-and-in gear-ratchets with the axle and driving-wheels of a rotary plow.

In describing my invention I will use reference letters of like name and kind to indicate like parts in each of the figures.

A A represent the plow shares or blades, having a rotary motion with the shaft B, upon which they are supported, said blades having the general form of a propelling-screw.

The plow-shaft is connected at its forward end to the axle C of the supporting and driving wheels G G, and at right angles thereto, by means of a loose journal-band, D, which clasps the axle and allows it to turn freely therein, and also allows the end of the shaft to which the blades are attached to rise or fall (swinging on the axle) as may be required, for different depths of cut, or to pass over obstructions.

A bevel-pinion, E, is placed on the plow-shaft, which meshes with the bevel-wheel F on the driving-wheel axle, so that the forward movement of the machine causes the rotation of the plow-blades at right angles to the line of said forward movement.

The screw-pitch of the plow-blades and the time of their revolution should be such as to give them a lead in excess of the forward movement of the machine, so that they may exert a propelling force assisting said forward movement, and not drag, as would be the case if their lead was less than said forward movement.

The entering edge of the blades is made sharp, so that it will act as a colter and cut into the soil to allow the plow-blade to pass through easily. From the entering or colter edge the blade begins to curve from the periphery toward the center, which curvature gradually increases toward the back or leaving edge thereof, so that as the blade passes through the soil it lifts and turns the soil over in the same manner that the mold-board of the common plow turns its furrow.

The blades are made adjustable on the plow-shaft, so that they may be brought nearer together or moved farther apart to regulate the width of the furrow which they cut. Two, three, or four blades may be used, if desired.

One or more cutters, A', may be projected from the periphery of each blade, at right angles to the surface thereof, or nearly so, which give a horizontal or under cut which slices the mold or furrow from the ground and causes it to follow up the blade freely.

The compound motion of the plow-blades causes them to cut a double furrow—*i. e.*, a longitudinal furrow corresponding to their forward movement, and a transverse furrow corresponding to their rotary motion. The blades are connected to the plow-shaft at their forward or entering end or side, so that the delevery or rear end of the plow is left entirely free, open, and unobstructed.

J represents a rectangular frame, which is supported upon the axle of the driving-wheels, which frame answers the purpose of supporting the plow-blades, to regulate their depth of cut, and also for supporting the driver's seat, where horse-power is used, or a steam-engine, where steam-power is used for driving the plow.

K represents an adjusting-screw which has a hinged or swivel connection to the plow-shaft, as shown at $l$, and passes through and works in a suitable nut placed on the rear cross-piece of the frame.

At the upper end of this adjusting-screw is placed a hand-wheel, M, for turning the same. Between the plow-shaft and cross-piece of the frame and around the adjusting-screw is placed a rubber or coil spring, N. The object of the adjusting-screw is to hold the plow-blades to their work, and set them to cut a furrow of any required depth, and by it the plow-blades may be raised or lowered and held to their work as desired. The spring N will allow the shaft to vibrate sufficient to allow the blades to pass small stones and ordinary light obstructions. The plow-shaft is further supported by the diagonal brace O, which is connected to the axle of the driving-wheels by the collar P, and to the plow-shaft by a suitable collar or joint, as shown at Q.

Ratchet-teeth are formed on the hubs G' of the driving-wheels, which mesh with corresponding fixed ratchet-wheels H on the driving axle, sufficient play being given the hubs of the driving-wheels to allow the ratchets to throw out of gear when the machine is backed. Spiral springs I are placed on the axle to hold the wheels in gear with the ratchets when the plow is drawn forward.

R represents a draft-pole to which horses are attached, and S, the driver's seat.

What I claim as my invention, and desire to secure by Letters Patent, is—

1. Giving the helical or screw plow-blades of a rotary plow, in addition to their screw form, an additional curvature from the periphery toward the center, beginning at or near the entering edge and gradually increasing toward the leaving edge, the same being a development of the mold-board of the common plow around an axis of revolution, substantially as described.

2. Attaching to a rotary plow-blade at any suitable place thereon a horizontally-projecting cutter, in order to give a horizontal slicing under-cut to the furrow, substantially as set forth.

3. Making rotary plow-blades adjustable on their propelling-shaft, so that they may be set to cut furrows of different widths by attaching two, three, or more blades to the shaft, as set forth.

4. Connecting the plow-blades to the plow-shaft so that their delivery end shall project in rear of the shaft and be left free and unobstructed, substantially as described.

5. Connecting the plow-shaft to the axle of the driving-wheels by a loose journal, D, so as to allow the plow to vibrate in order to pass small stones and other light obstructions, substantially as set forth.

LEVI N. COLBORN.

Witnesses:
W. H. FORBUSH,
F. A. LANGWORTHY.